US009485461B2

(12) United States Patent
Sharma

(10) Patent No.: US 9,485,461 B2
(45) Date of Patent: Nov. 1, 2016

(54) VIDEO CONFERENCING USING WIRELESS PERIPHERAL VIDEO CONFERENCING DEVICE

(71) Applicant: Sony Mobile Communications AB, Lund (SE)

(72) Inventor: Bhanu Sharma, Burlingame, CA (US)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 187 days.

(21) Appl. No.: 14/372,819

(22) PCT Filed: Mar. 19, 2013

(86) PCT No.: PCT/US2013/032914
§ 371 (c)(1),
(2) Date: Jul. 17, 2014

(87) PCT Pub. No.: WO2013/142470
PCT Pub. Date: Sep. 26, 2013

(65) Prior Publication Data
US 2015/0304604 A1    Oct. 22, 2015

Related U.S. Application Data

(60) Provisional application No. 61/612,425, filed on Mar. 19, 2012.

(51) Int. Cl.
*H04N 7/14* (2006.01)
*H04N 7/15* (2006.01)
(Continued)

(52) U.S. Cl.
CPC .............. *H04N 7/147* (2013.01); *H04N 7/142* (2013.01);
(Continued)

(58) Field of Classification Search
USPC .................... 348/14.01–14.16; 370/259–271, 370/351–357; 379/67.1–88.28, 201.01, 379/202.01–207.01; 709/201–207, 709/217–248
See application file for complete search history.

(56) References Cited

U.S. PATENT DOCUMENTS

| 7,996,040 B1* | 8/2011 | Timm | H04N 21/4126 455/41.2 |
| 8,126,129 B1* | 2/2012 | McGuire | H04M 3/568 379/202.01 |

(Continued)

FOREIGN PATENT DOCUMENTS

WO    2006005375 A1    1/2006

OTHER PUBLICATIONS

International Search Report and Written Opinion dated Jul. 4, 2013, issued in corresponding PCT application No. PCT/US2013/032914, 12 pages.

(Continued)

*Primary Examiner* — Hemant Patel
(74) *Attorney, Agent, or Firm* — Tucker Ellis LLP

(57) ABSTRACT

A method includes receiving, establishing, by a video session controlling device, a video conference session. The video session controlling device includes at least one video conference service providing component. The method includes identifying a specification of the at least one video conference service providing component. The method also includes identifying a position of the at least one video conference service providing component. A specification of at least one wireless peripheral video conferencing device is identified. A position of the at least one wireless peripheral video conferencing device is also identified. The method also includes determining a combination of devices to provide the video conference services based on relative specifications and positions of the at least one video conference service providing component and the at least one wireless peripheral video conferencing device. The video conference services are implemented using the determined combination of devices.

12 Claims, 6 Drawing Sheets

(51) Int. Cl.
 H04N 21/41 (2011.01)
 H04N 21/414 (2011.01)
 H04N 21/422 (2011.01)
 H04N 21/4223 (2011.01)
 H04N 21/4363 (2011.01)
 H04N 21/4788 (2011.01)
(52) U.S. Cl.
 CPC ............ *H04N 7/15* (2013.01); *H04N 21/4122* (2013.01); *H04N 21/41407* (2013.01); *H04N 21/4223* (2013.01); *H04N 21/42203* (2013.01); *H04N 21/43637* (2013.01); *H04N 21/4788* (2013.01)

(56) References Cited

U.S. PATENT DOCUMENTS

| | | | | |
|---|---|---|---|---|
| 8,738,072 B1* | 5/2014 | Messerian | ........... | H04M 1/7253 348/14.02 |
| 8,842,153 B2* | 9/2014 | Ranganath | ............ | H04M 3/565 348/14.01 |
| 9,020,109 B2* | 4/2015 | Oswal | ...................... | H04M 3/56 370/260 |
| 2004/0030749 A1* | 2/2004 | Bowman-Amuah | | H04L 29/06027 709/204 |
| 2006/0203758 A1* | 9/2006 | Tee | ........................ | H04W 88/04 370/315 |
| 2008/0246835 A1 | 10/2008 | Tian | | |
| 2008/0291260 A1 | 11/2008 | Dignan et al. | | |
| 2009/0174763 A1* | 7/2009 | Bengtsson | ............ | H04N 7/147 348/14.08 |
| 2009/0285131 A1* | 11/2009 | Knaz | ........................ | H04M 3/56 370/260 |
| 2010/0037272 A1* | 2/2010 | Lin | ........................ | H04N 21/436 725/81 |
| 2011/0145859 A1* | 6/2011 | Novack | ............ | H04N 21/43615 725/38 |
| 2013/0106977 A1* | 5/2013 | Chu | ........................ | H04N 7/142 348/14.02 |
| 2013/0185447 A1* | 7/2013 | Nagawade | ............ | H04W 8/005 709/228 |
| 2013/0342637 A1* | 12/2013 | Felkai | ...................... | H04N 7/14 348/14.08 |
| 2014/0073300 A1* | 3/2014 | Leeder | ................. | H04B 5/0031 455/416 |

OTHER PUBLICATIONS

Ohta, K. et al. "Adaptive Terminal Middleware for Session Mobility," Multimedia Signal Processing, 2002 IEEE Workshop on Dec. 9-11, 2002, Piscataway, NJ, US, IEEE, May 19, 2003.

* cited by examiner

VIDEO CONFERENCING USING WIRELESS PERIPHERAL VIDEO CONFERENCING DEVICE

BACKGROUND

Video conferencing is a popular technology, used by service providers to allow users to communicate with audio and video. Each user has a device that includes a camera that shoots a video stream of the user. The device sends the video stream to other users and displays video streams received from the other users.

BRIEF DESCRIPTION OF THE DRAWINGS

The accompanying drawings, which are incorporated in and constitute part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for providing video conferencing using wireless peripheral video conferencing devices, such as a display and a camera. A video conference session controlling device, such as a mobile phone, may establish a video conference session and implement the video conference session using wireless control of the peripheral video conferencing devices.

Figure 1:
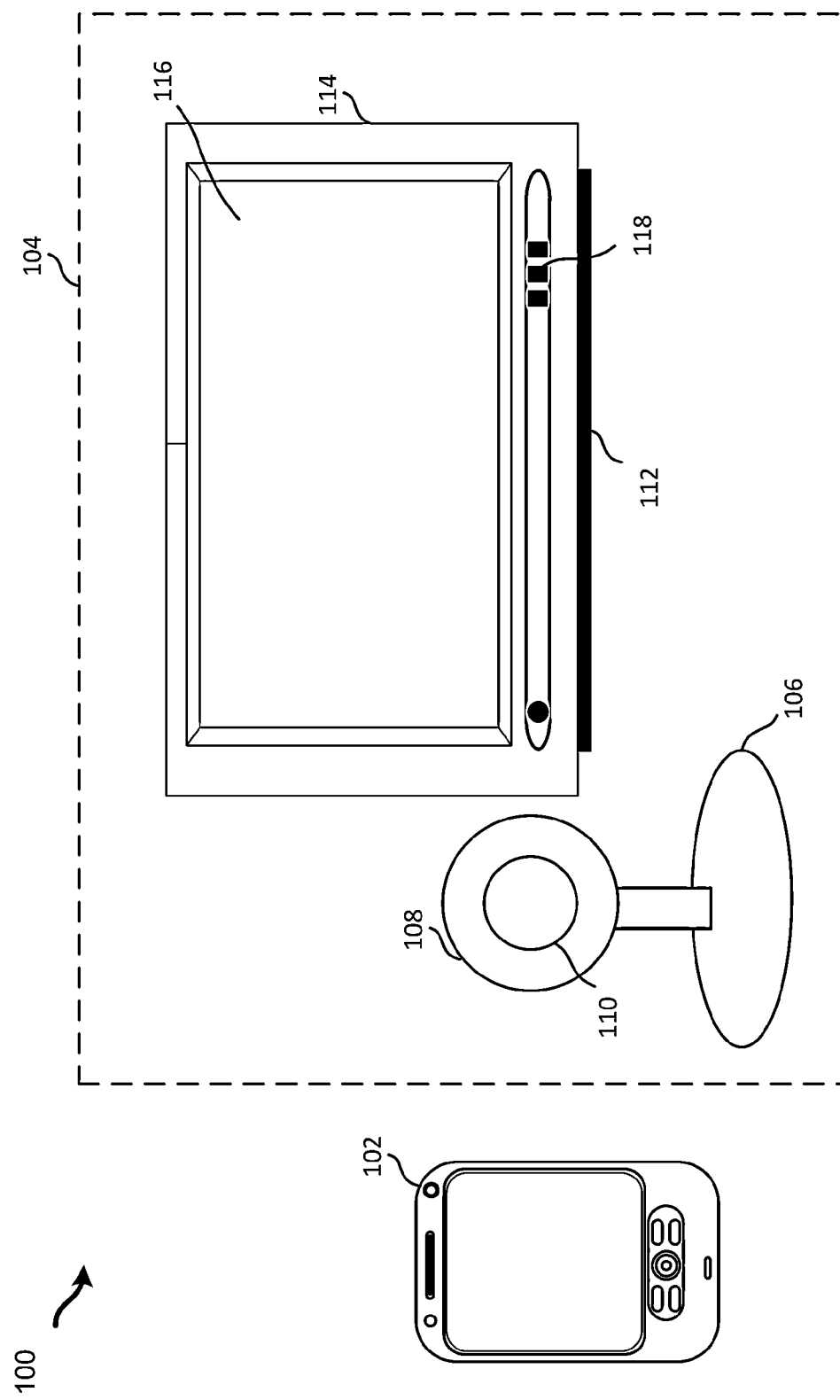
FIG. 1 is a diagram of exemplary system in which methods and systems described herein may be implemented.

FIG. 1 is a diagram of an exemplary system 100 in which systems and/or methods described herein may be implemented. As illustrated, system 100 may include a video conference session controlling device (VCSCD) 102, and wireless peripheral video conferencing devices (WPVCDs) 104. WPVCDs 104 may include a wireless camera 106 and a wireless display 112. The configuration of components of system 100 illustrated in FIG. 1 is for illustrative purposes. Other configurations may be implemented. Therefore, system 100 may include additional, fewer and/or different components than those depicted in FIG. 1. Also, in some instances, one or more of the components of system 100 may perform one or more functions described as being performed by another one or more of the components of system 100.

As described herein, WPVCDs 104 are peripheral devices that may be used to provide video conferencing services. Video conferencing services include the capture of audio and video from the user ("shooting the video) and the receipt and display of video streams (including audio and video) from a person(s) at the other end(s) of the video conference. Although WPVCDs 104 are described with respect to camera 106 and display 112, other WPVCDs 104 may be used, such as peripheral audio devices (i.e., speakers, microphones, etc.). Additionally, although camera 106 and display 112 are described as separate components, in some implementations, camera 106 and display 112 may be components of a same device.

Camera 106 may be a video camera or other device that is capable of shooting a video stream. Camera 106 may include associated wireless networking capabilities that may be used to interface with VCSCD 102 (using a wireless communication protocols, such as Wi-Fi). As shown in FIG. 1, camera 106 may include a camera mount 108 and a lens 110. Camera mount 108 may be used to position camera 106 with respect to a subject, such as the user, and camera lens 110 is an optical lens (or combination of optical lenses) used to shoot images, such as the user, that may be encoded and output to another user (i.e., a person at the other end of the video conference).

Camera 106 may provide notification of the presence of camera 106 to VCSCD 102 either in response to a request for notification from VCSCD 102 or based on a predetermined schedule of notification, for example at predetermined intervals. Camera 106 may also provide specifications of camera 106, including its video stream capabilities. For example, camera 106 may provide parameters indicating the quality of the video stream, zoom capabilities, image stabilization, etc. Additionally, camera 106 may include capability to determine a position of camera 106, including an alignment of camera mount 108, and/or when camera 106 is aimed at the user. Camera 106 may determine the position of camera 106 either on its own or in conjunction with VCSCD 102.

Display 112 may include a casing 114, a screen 116, and speakers 118. TV 102 may play a video stream, for example, received from VCSCD 102. Display 112 may display a video stream(s) received from persons at the other ends of each video conference. Display 112 may have particular specifications, including its display capabilities, such as a size and resolution of display 112, video bandwidth, etc. Similarly as described with respect to camera 106, display 112 may include capability to provide notification of its presence, including position and specifications of display 112. According to one example, display 112 may include a capability to simultaneously display multiple camera feeds, e.g., in a split screen, picture in picture or inset manner.

According to one implementation, display 112 and/or camera 106 may provide access to the capability to detect position of display 112 and/or camera 106 with regard to VCSCD 102 and/or the user to additional systems, applications, and/or devices (e.g., a gaming application).

VCSCD 102 may provide video conferencing using wireless control of WPVCDs 104, such as wireless camera 106 and display 112. VCSCD 102 may control a video conference session while positioned in sufficient proximity to exert wireless control over detected WPVCDs 104. For example, VCSCD 102 may be placed in a user's pocket (after receiving input to contact a particular user) and provide video conferencing using wireless control of WPVCDs 104. VCSCD 102 may establish a video conference session with the other user (e.g., the user may initiate a video conferencing session by inputting information for one or more additional parties). VCSCD 102 may detect WPVCDs 104 and provide video conference services, such as shooting a video stream of the user and displaying a video stream received from the other user, using camera 106 and display 112, respectively. VCSCD 102 may automatically provide video conference services using WPVCDs 104 that are in a detected alignment with respect to the user and/or that include particular specifications (e.g., as determined with respect to other available cameras or displays). Alternatively, VCSCD 102 may provide an option for the user to switch to a particular WPVCDs 104 to provide a video conferencing service(s).

According to one implementation, VCSCD 102 may receive a position and specification of display 112 (provided by/in conjunction with display 112) and VCSCD 102 may automatically/manually implement video conferencing services (in this instance shooting the video stream) using display 112. For example, VCSCD 102 may provide an option for the user to select a particular display 112 or camera 106 while conducting a video conference session.

In another implementation, VCSD 102 may provide a capability for one or more receiving parties to input preferences for WPVCDs 104. VCSD 102 may determine a combination of WPVCDs 104 based on the preferences associated with the receiving parties. For example, a receiving party may request a particular WPVCD 104. VCSD 102 may also provide an option for the user to allow a receiving party of the conference call to access controls to WPVCDs 104 selected by the user. The receiving party may receive audio and/or video feeds from multiple WPVCDs 104 associated with the user (e.g., in a split screen manner). The user may allow the receiving party may access functionality and control capabilities associated with each WPVCD 104, such as zooming or moving an angle of the WPVCD 104 using servo-motors associated with the WPVCD 104.

Figure 2:
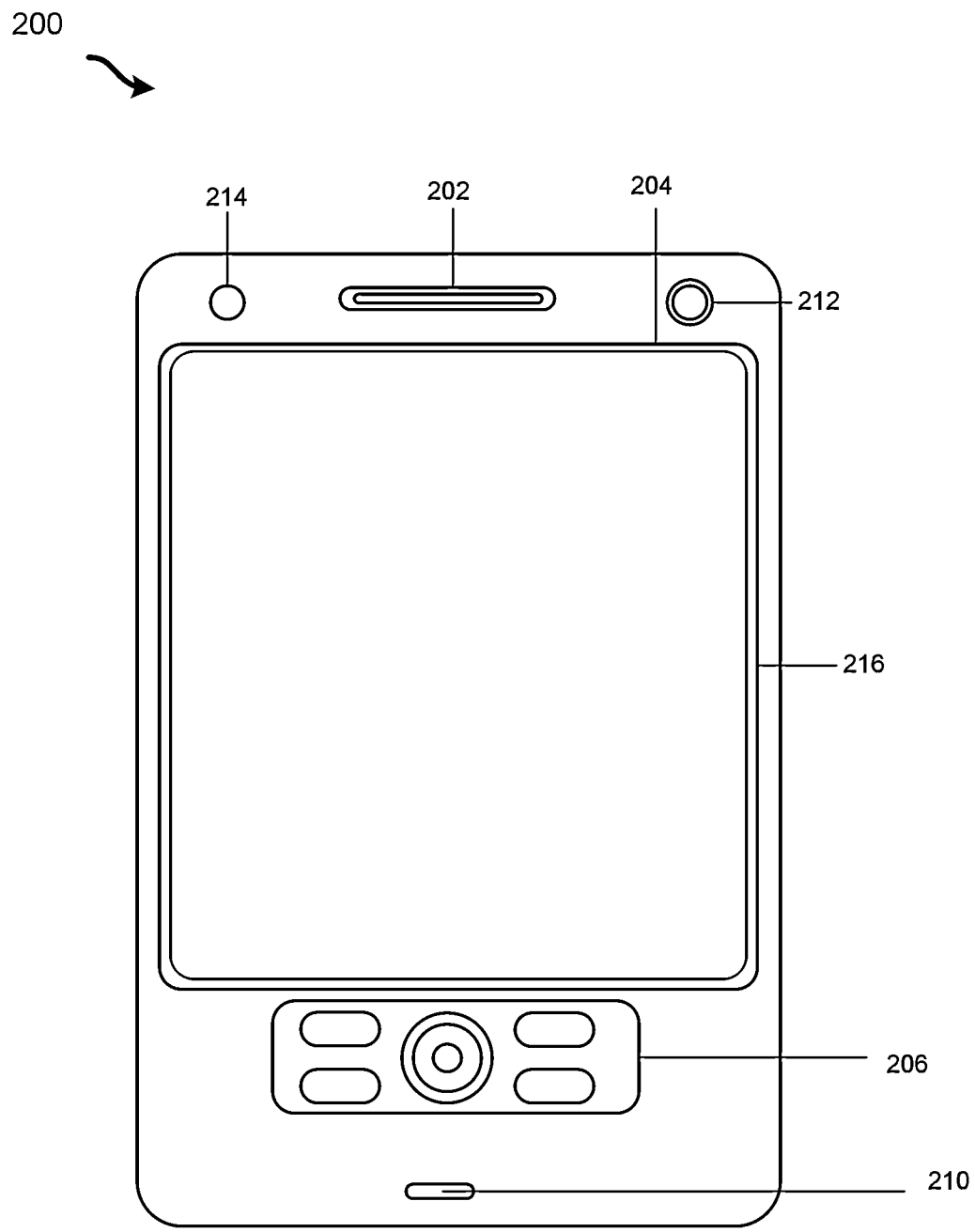
FIG. 2 is a diagram of an exemplary video conference session controlling device in which methods and systems described herein may be implemented.

VCSCD 102 may be configured, for instance, as described with respect to FIG. 2 and VCSCD 200.

FIG. 2 is a diagram illustrating components of an exemplary VCSCD 200 in which systems and methods described herein may be implemented. Although illustrated as a mobile phone, VCSCD 200 may include any of the following devices: a mobile telephone; a cellular phone; a personal communications system (PCS) terminal that may combine a cellular radiotelephone with data processing, facsimile, and/or data communications capabilities; an electronic notepad, a tablet computer, a laptop, and/or a personal computer; a personal digital assistant (PDA) that can include a telephone; a gaming device or console; a peripheral (e.g., wireless headphone); a digital camera; or another type of computational or communication device.

In this implementation, VCSCD 200 may take the form of a mobile phone (e.g., a cell phone). As shown in FIG. 2, VCSCD 200 may include a speaker 202, a touchscreen display 204, control buttons 206, a microphone 210, sensors 212, a front camera 214, and a housing 216. Speaker 202 may provide audible information to a user of VCSCD 200. Although VCSCD 200 is shown with particular components and a particular configuration, VCSCD 200 may include fewer, more or different components, such as additional sensors, input devices, and may include associated devices (e.g., a stylus) etc.

Display 204 may provide visual information to the user, such as an image of a caller, video images, or pictures. In addition, display 204 may include a touchscreen for providing input to VCSCD 200. Display 204 may provide hardware/software to detect the coordinates of an area that is touched by a user. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

Control buttons 206 may permit the user to interact with VCSCD 200 to cause VCSCD 200 to perform one or more operations, such as initiate a video conference session. In some implementations, control buttons 206 may include a telephone keypad (not shown) that may be complementary (or alternative) to graphical user interface (GUI) objects generated on touchscreen display 204. Microphone 210 may receive audible information from the user. Sensors 212 may collect and provide, to VCSCD 200, information (e.g., acoustic, infrared, etc.) that is used to aid the user in capturing images or in providing other types of information (e.g., a distance between a user and VCSCD 200). Front camera 214 may enable a user to view, capture and store images (e.g., pictures, video clips) of a subject in front of VCSCD 200. Housing 216 may provide a casing for components of VCSCD 200 and may protect the components from outside elements.

In implementations described herein, VCSCD 200 may include associated machine-readable instructions that support wireless video conferencing via peripheral video conferencing devices, such as display 112 and/or camera 106 described with respect to FIG. 1. When VCSCD 200 is implementing a video conference session, VCSCD 200 may identify speaker 202, display 204, microphone 210, and camera 214 as video conference service providing components (i.e., components that may be used to provide a video conference service such as video streaming, display etc.). VCSCD 200 may establish a video conference session and provide video conferencing services via display 112 and/or camera 106 based on a comparison between the video conference service providing components and WPVCDs 104, as described with respect to FIG. 5 and process 500.

Figure 3:
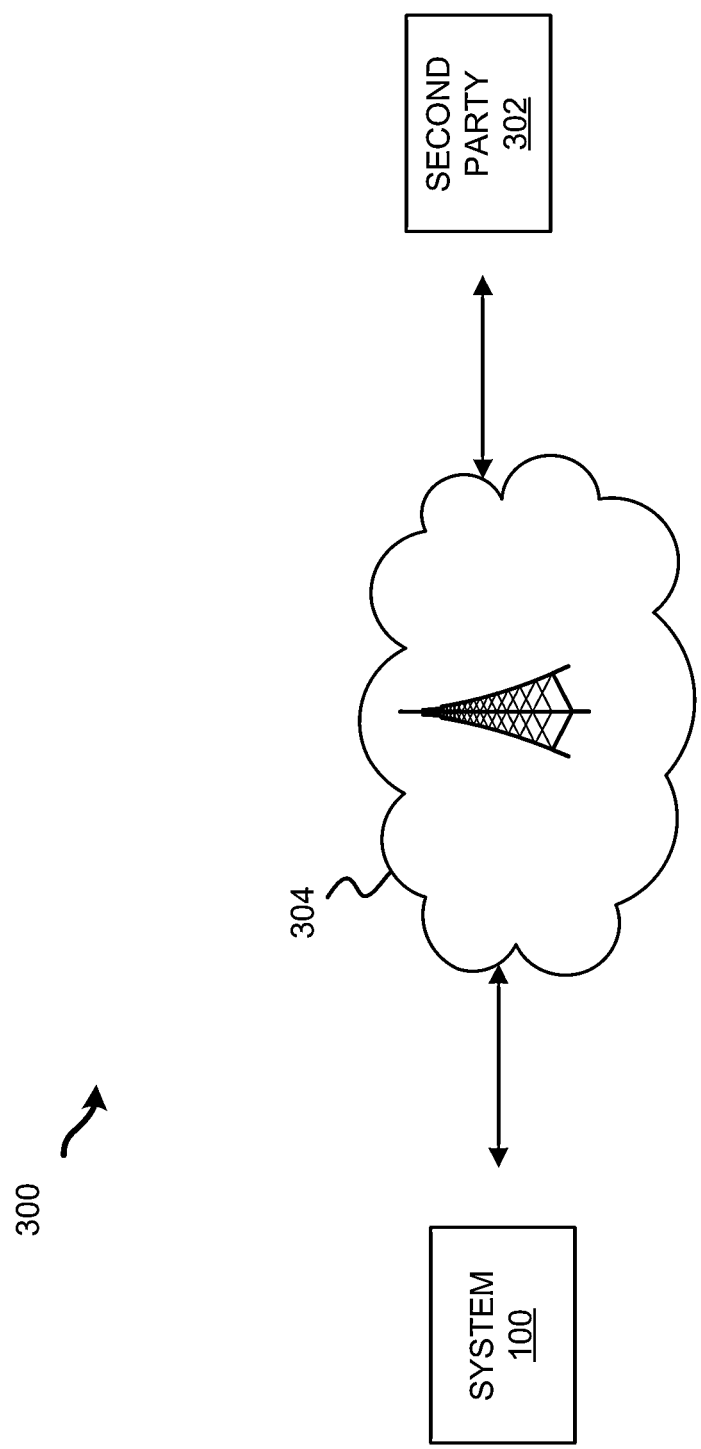
FIG. 3 is a diagram of exemplary peripheral video conferencing devices for implementing embodiments disclosed herein.

FIG. 3 is a diagram of an exemplary network 300 in which systems and/or methods described herein may be implemented. As illustrated, network 300 may include a system 100, a second party 302 to the video conference session and a network 304. System 100 and second party 302 may be interconnected by network 304. Components of network 300 may be interconnected via wired and/or wireless connections.

As shown in FIG. 3, second party 302 may communicate with system 100 over network 304 using a camera and display, for example as described with respect to FIG. 1. Alternatively, second party 302 may include other configurations of cameras and displays such as a single laptop that includes a display and camera. In any event, second party 302 may send a video stream to VCSCD 102 in system 100 via network 304. Additionally VCSCD 102 may send (or direct the sending of) a video stream to second party 302 via network 304 (e.g., by providing instructions, Internet protocol (IP) addresses, etc., for second party 302 to camera 106).

Network 304 may include one or more wired and/or wireless networks that are capable of receiving and transmitting data, voice and/or video signals, including multimedia signals that include voice, data and video information. Network 304 may include one or more wireless/mobile networks and/or a public switched telephone network (PSTN). Network 304 may include one or more packet switched networks, such as an Internet protocol (IP) based network, a local area network (LAN), a wide area network (WAN), a personal area network (PAN), an intranet, the Internet, or another type of network that is capable of transmitting data. Network 304 may include one or more high-speed data networks, such as a very high performance backbone network services (vBNS) network.

Figure 4:
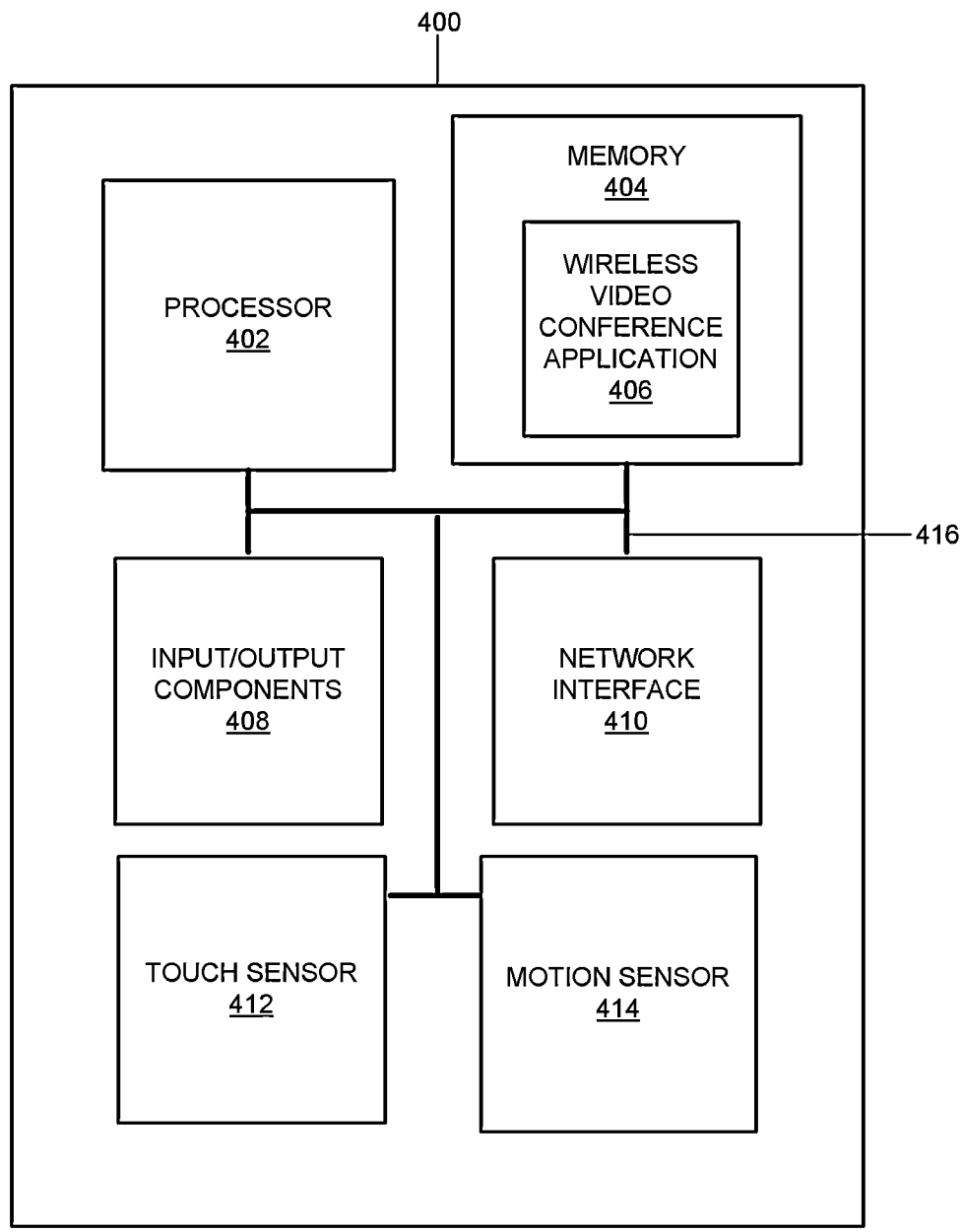
FIG. 4 is a diagram of an exemplary network in which methods and systems described herein may be implemented.

FIG. 4 is a block diagram of exemplary components of device 400. Device 400 may represent components implemented or included within VCSCD 102, VCSCD 200, camera 106, or display 106. As shown in FIG. 4, device 400 may include a processor 402, a memory 404, input/output components 408, a network interface 410, and a communication path 416. In different implementations, device 400 may include additional, fewer, or different components than the ones illustrated in FIG. 4. For example, device 400 may include additional network interfaces, such as interfaces for receiving and sending data packets.

Processor 402 may include a processor, a microprocessor, an Application Specific Integrated Circuit (ASIC), a Field Programmable Gate Array (FPGA), and/or other processing logic (e.g., audio/video processor) capable of processing information and/or controlling device 400.

Memory 404 may include static memory, such as read only memory (ROM), and/or dynamic memory, such as random access memory (RAM), or onboard cache, for storing data and machine-readable instructions. Memory 404 may also include storage devices, such as a floppy disk, compact disc read only memory (CD ROM), compact disc (CD) read/write (R/W) disc, and/or flash memory, as well as other types of storage devices.

Memory 404 may store wireless video conference application 406. Wireless video conference application 406 may include machine-readable instructions that support wireless video conferencing via peripheral video conferencing devices, such as described hereinbelow with regard to process 500 and FIG. 5 and/or process 600 and FIG. 6.

Input/output components 408 may include a keyboard or keypad, voice recognition mechanisms, Universal Serial Bus (USB), speakers, a microphone, a thermometer, and/or other types of components for providing an input/output to/from device 400.

Network interface 410 may include any transceiver-like mechanism that enables device 400 to communicate with other devices and/or systems. For example, network interface 410 may include mechanisms for communicating via a network, such as the Internet, a terrestrial wireless network (e.g., a WLAN), a cellular network, a satellite-based network, a wireless personal area network (WPAN), etc. Additionally or alternatively, network interface 410 may include a modem, an Ethernet interface to a LAN, and/or an interface/connection for connecting device 400 to other devices (e.g., a Bluetooth interface).

Touch sensor 412 may provide information regarding contact received from a user at a particular portion of a touchscreen display of device 400. Touch sensor 412 may be embedded/integrated into touchscreen display associated with device 400.

Motion sensor 414 may include an accelerometer, gyroscope, etc. that provides information regarding motion of device 400. Motion sensor 414 may periodically determine motion of device 400. Additionally, motion sensor 414 may detect a position and/or motion of external objects, including the user, with regard to device 400.

Communication path 416 may provide an interface through which components of device 400 may communicate with one another.

Figure 5:
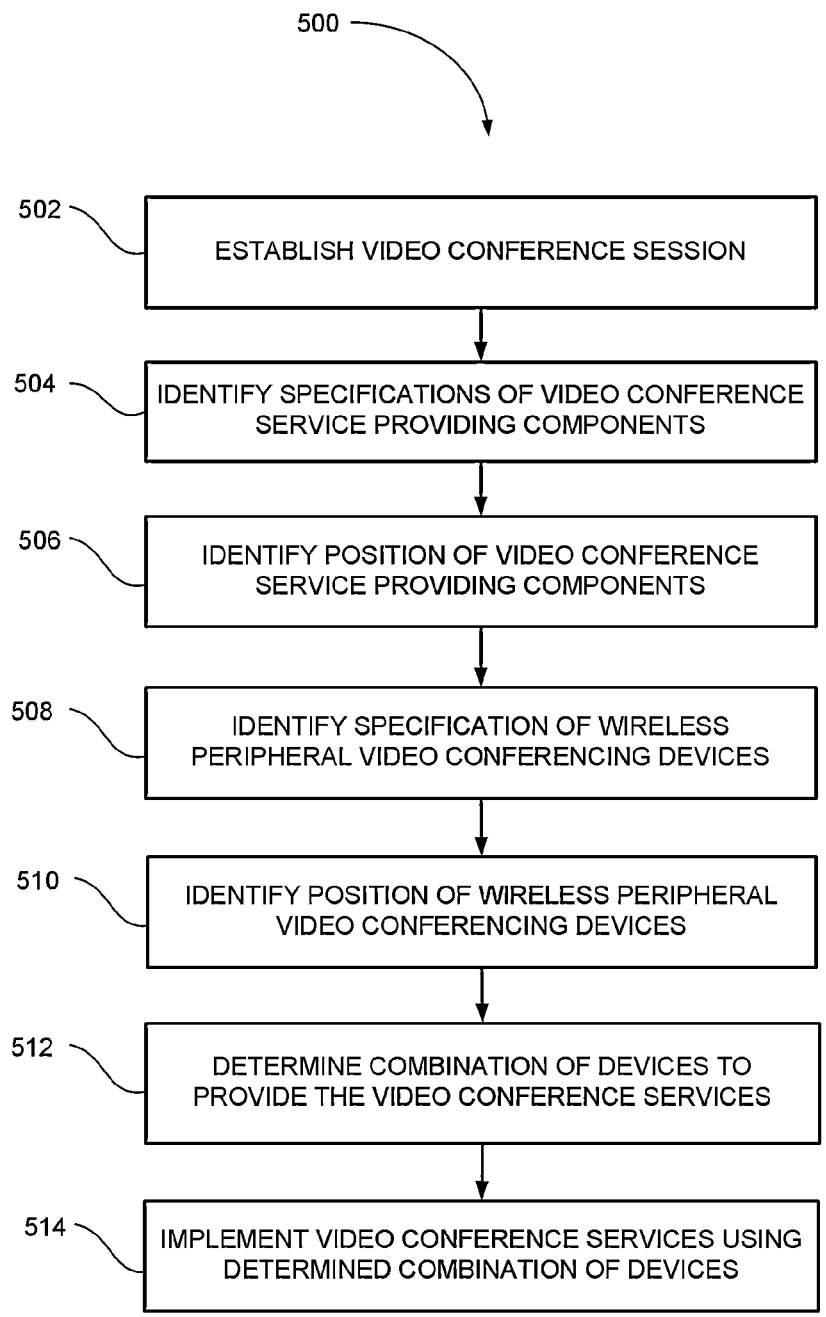
FIG. 5 is a block diagram of exemplary components of the devices of FIGS. 1-4.

FIG. 5 is a flowchart of an exemplary process 500 for video conferencing using wireless control of peripheral video conferencing devices in a manner consistent with implementations described herein. Process 500 may execute in VCSCD 102. It should be apparent that the process discussed below with respect to FIG. 5 represents a generalized illustration and that other elements may be added or existing elements may be removed, modified or rearranged without departing from the scope of process 500.

At block 502, VCSCD 102 may establish a video conference session. For example, VCSCD 102 102 may place a video conference call to another party that is video conference enabled, such as second party 302. Alternatively, VCSCD 102 may receive a video conference call from second party 302. In any event, VCSCD 102 may receive a video stream from second party 302 (second party video stream) and send a video stream to second party during the video conference session.

VCSCD 102 may identify specifications of video conference service providing components associated with (or integrated into) VCSCD 102 (block 504). For example, VCSCD 102 may include a display with particular specifications, such as a display screen with a particular resolution, size, etc. Additionally, VCSCD 102 may identify a position of the video conference service component (and, accordingly in some instances, VCSCD 102) with regard to a user of VCSCD 102 (block 506). For example, motion sensors 414 associated with VCSCD 102 may identify a position of the user with regard to the display of VCSCD 102.

VCSCD 102 may identify specifications of available WPVCDs 104 (block 508). For example, VCSCD 102 may receive a wireless notification message from camera 106. Camera 106 may provide the notification message indicating the presence of camera 106 to VCSCD 102 either independently of, or in response to a request for notification from, VCSCD 102. The notification message may include the specifications of camera 106. Alternatively, camera 106 may provide information regarding specification at a later time.

At block 510, VCSCD 102 may identify a position of WPVCDs 104 with respect to users. For example, VCSCD 102 may receive information indicating a position of WPVCDs 104 with respect to the user from WPVCDs 104. The information may include a distance of the user from, for example, camera 106 or display 112.

According to an embodiment, WPVCDs 104 may provide information indicating a posture of the user. For example, motion detectors and machine-readable instructions associated with camera 106 may indicate whether the user is facing camera 106.

VCSCD 102 may compare specifications and positions of the video conference service providing components associated with VCSCD 102 and the WPVCDs 104 to determine a combination of devices to provide the video conference services (block 512). For example, VCSCD 102 may compare specifications and position of camera 106 with specifications and position of a camera that is integrated into VCSCD 102. VCSCD 102 may select camera 106 to provide the video stream based on a relatively closer position of camera 106 with respect to the user. Similarly, VCSCD 102 may compare specifications and position of display 112 with specifications and position of a display that is integrated into VCSCD 102. VCSCD 102 may select display 112 to provide display the video stream received from second party 302 based on specifications of display 112, such as a size of display 112.

At block 514, VCSCD 102 may implement video conference services using the determined combination of devices, including WPVCDs 104 among the determined combination of video service providing elements. For example, VCSCD 102 may offer to switch or may automatically switch to WPVCDs 104 based on determination at 512. VCSCD 102 may implement communication with WPVCDs 104 internally.

Figure 6:
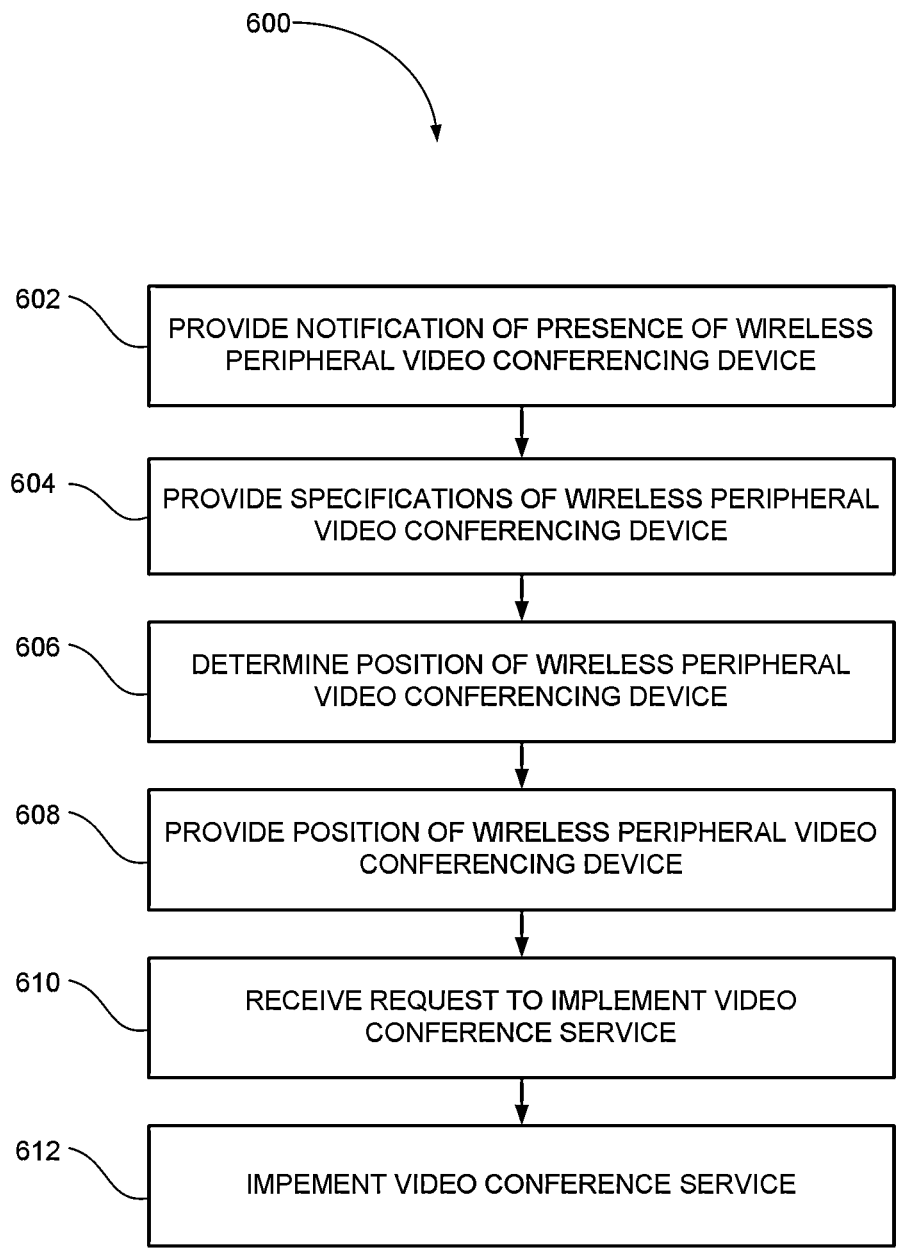
FIG. 6 is a flow diagram of an exemplary process of video conferencing using wireless peripheral video conferencing devices consistent with implementations described herein.

FIG. 6 is a flowchart of an exemplary process 600 for video conferencing using wireless control of peripheral video conferencing devices in a manner consistent with implementations described herein. Process 600 may execute in WPVCDs 104, such as camera 106. Although process 600 is described with respect to camera 106, process 600 may be implemented for display 112 or other WPVCDs 104, such as display 112. It should be apparent that the process discussed below with respect to FIG. 6 represents a generalized illustration and that other elements may be added or existing elements may be removed, modified or rearranged without departing from the scope of process 600.

At block 602, WPVCD 104 may provide notification of the presence of that WPVCD 104. For example, camera 106 may provide notification of the presence of camera 106, for example to VCSCD 102. Similarly, display 112 may provide notification of the presence of display 112 to VCSCD 102. WPVCDs 104 may communicate wirelessly with VCSCD 102 and may not have a fixed association with VCSCD 102. WPVCD 104 may also provide specification of the WPVCD 104 (block 604).

At block 606, WPVCD 104 may determine a position of WPVCD 104 with respect to the user and/or VCSCD 102. For example, WPVCD 104 may include motion sensors that may detect a position of WPVCD 104. According to an embodiment, camera 106 may include tracking mechanisms that "lock onto" a particular object, such as the user, and may provide updated indications of the position of camera 106 to VCSCD 102.

At block 608, WPVCD 104 may provide an indication of the position, for example with respect to a user, to VCSCD 102. For example, camera 106 may provide an indication of the position, for example with respect to a user, to VCSCD 102. Camera 106 may wirelessly provide the indication of the position and specifications of camera 106 in response to a request for that information from VCSCD 102.

WPVCD 104 may receive a request to implement shooting of a video stream from VCSCD 102 (block 610). For example after VCSCD 102 selects camera 106 at block 514 of process 500 hereinabove, camera 106 may receive a request to implement video conference service (shooting the video of the user) and an Internet protocol (IP) address of a recipient second party 302.

At block 612, WPVCD 104 may implement the video conference service. For example, camera 106 may implement shooting, encoding, and streaming of the video stream to second party 302. Camera 106 (and display 112) may include an extra layer in a camera driver for camera 106 that implements the video streaming to convey to third-party machine-readable instructions for video conferencing (e.g., a video chat program via which the users are video conferencing) that VCSCD 102 is implementing the video conference service (e.g., third party machine-readable instructions acts as if video shooting and streaming is being done by a default camera (e.g., an integrated camera) associated with VCSCD 102). Second party 302, and the third-party machine-readable instructions, may then communicate with VCSCD 102 via the driver for camera 306 in a similar manner as if the communication was with a single device (i.e., functionally, from the perspective of third-party machine-readable instructions, camera functions and streaming implemented in camera 306 by VCSCD 102 appear to be from VCSCD 102).

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary processes, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   establishing, by a video session controlling device, a video conference session with at least one party, wherein the video session controlling device includes at least one video conference service providing component;
   identifying at least one specification of the at least one video conference service providing component;
   identifying a position of the at least one video conference service providing component;
   identifying at least one specification of at least one wireless peripheral video conferencing device;
   identifying a position of the at least one wireless peripheral video conferencing device;
   determining a combination of devices to provide video conference services for the video conference session based on relative specifications and positions of the at least one video conference service providing component and the at least one wireless peripheral video conferencing device; and
   implementing video conference services using the determined combination of devices; and
   wherein determining the combination of devices to provide the video conference services further comprises:

receiving a preference associated with a second party to the video conference session; and determining the combination of devices based on the preference associated with the second party.

2. The computer-implemented method of claim 1, wherein implementing the video conference services using the determined combination of devices further comprises:

implementing one of more of shooting a video stream of a user of the video session controlling device and displaying a video stream received from the at least one party.

3. The computer-implemented method of claim 1, wherein the at least one wireless peripheral video conferencing device includes one or more of a wireless camera, a wireless display, a wireless microphone, and a wireless speaker.

4. The computer-implemented method of claim 1, wherein the at least one video conference service providing component is a display and identifying the at least one specification of at least one wireless peripheral video conferencing device further comprises:

identifying one or more of a size of the display, a resolution of the display, and image quality of the display.

5. The computer-implemented method of claim 1, wherein the at least one video conference service providing component is a video camera and identifying the at least one specification of at least one wireless peripheral video conferencing device further comprises:

identifying one or more of a quality of a video stream, a zoom capability, and an image stabilization capability.

6. The computer-implemented method of claim 1, wherein implementing video conference services using the determined combination of devices further comprises:

one or more of automatically implementing the video services using the determined combination of devices and providing an option to a user to implement the video services using the determined combination of devices.

7. A computer-implemented method comprising:

establishing, by a video session controlling device, a video conference session with at least one party, wherein the video session controlling device includes at least one video conference service providing component;

identifying at least one specification of the at least one video conference service providing component;

identifying a position of the at least one video conference service providing component;

identifying at least one specification of at least one wireless peripheral video conferencing device;

identifying a position of the at least one wireless peripheral video conferencing device;

determining a combination of devices to provide video conference services for the video conference session based on relative specifications and positions of the at least one video conference service providing component and the at least one wireless peripheral video conferencing device;

implementing video conference services using the determined combination of devices; and providing control capabilities associated with the combination of devices to a second party to the video conference session.

8. A video session controlling device, comprising:

a memory to store a plurality of instructions;

at least one video conference service providing component; and a processor configured to execute instructions in the memory to:

establish, by the video session controlling device, a video conference session with at least one party;

identify at least one specification of the at least one video conference service providing component;

identify a position of the at least one video conference service providing component;

identify at least one specification of at least one wireless peripheral video conferencing device;

identify a position of the at least one wireless peripheral video conferencing device;

determine a combination of devices to provide video conference services for the video conference session based on relative specifications and positions of the at least one video conference service providing component and the at least one wireless peripheral video conferencing device; and implement video conference services using the determined combination of devices; and wherein the instructions to determine the combination of devices to provide the video conference services further comprise instructions to:

receive a preference associated with a second party to the video conference session; and determine the combination of devices based on the preference associated with the second party.

9. The device of claim 8, wherein, when implementing the video conference services using the determined combination of devices, the processor is further configured to:

implement one of more of a shooting a video stream of a user of the video session controlling device and displaying a video stream received from the at least one party.

10. The device of claim 8, wherein the at least one wireless peripheral video conferencing device includes one or more of a wireless camera, a wireless display, a wireless microphone, and a wireless speaker.

11. The device of claim 8, wherein the at least one video conference service providing component is a display and, when identifying the at least one specification of at least one wireless peripheral video conferencing device, the processor is further configured to:

identify one or more of a size of the display, a resolution of the display, and image quality of the display.

12. The device of claim 8, wherein the at least one video conference service providing component is a video camera and, when identifying the at least one specification of at least one wireless peripheral video conferencing device, the processor is further configured to:

identify one or more of a quality of a video stream, a zoom capability, and an image stabilization capability.

* * * * *